US012625880B1

(12) United States Patent
Wu et al.

(10) Patent No.: US 12,625,880 B1
(45) Date of Patent: May 12, 2026

(54) GENERATING A VERSION VECTOR FOR A DATA OBJECT IN A DISTRIBUTED SYSTEM TO DETERMINE WHETHER THE DATA OBJECT IS CURRENT

(71) Applicant: Mango Technologies, Inc., San Diego, CA (US)

(72) Inventors: Jiang Wu, Union City, CA (US); Maxime Lasserre, Issaquah, WA (US); Stephane Major, Poway, CA (US)

(73) Assignee: Mango Technologies, Inc., San Diego, CA (US)

( * ) Notice: Subject to any disclaimer, the term of this patent is extended or adjusted under 35 U.S.C. 154(b) by 0 days.

(21) Appl. No.: 19/059,456

(22) Filed: Feb. 21, 2025

(51) Int. Cl.
*G06F 16/27* (2019.01)
*G06F 16/22* (2019.01)

(52) U.S. Cl.
CPC .......... *G06F 16/27* (2019.01); *G06F 16/2237* (2019.01)

(58) Field of Classification Search
CPC ...... G06F 16/27; G06F 16/273; G06F 16/275; G06F 16/278; G06F 16/2237
USPC ........................................ 707/638
See application file for complete search history.

(56) References Cited

U.S. PATENT DOCUMENTS

| | | | |
|---|---|---|---|
| 5,765,171 A * | 6/1998 | Gehani ................... | G06F 16/27 707/999.203 |
| 8,515,912 B2 * | 8/2013 | Garrod ................ | G06F 16/2329 707/638 |
| 11,775,500 B2 * | 10/2023 | Aron ................... | G06F 11/1469 707/691 |

FOREIGN PATENT DOCUMENTS

CN 101964820 A * 2/2011 ......... G06F 16/2365

* cited by examiner

*Primary Examiner* — Michael Pham
(74) *Attorney, Agent, or Firm* — Brannon IP, PLLC; Brian G. Brannon

(57) ABSTRACT
A distributed system includes multiple servers that various client devices access. Each server maintains a copy of a data object for access to the data object regardless of which server is accessed. Each server may modify a local copy of the data object, with the modifications propagated to other servers. A server generates a local version vector that includes pairs of a server identifier from whom modifications were received and a server-specific version identifier for the modifications. When a client device retrieves the data object, the client device transmits a client version vector for the data object including pairs of server identifiers and server-specific version identifiers from which the client device received version events for modifications to the data object. The server compares the local version vector to the client version vector to determine whether to transmit a local copy of the data object to the client device.

20 Claims, 4 Drawing Sheets

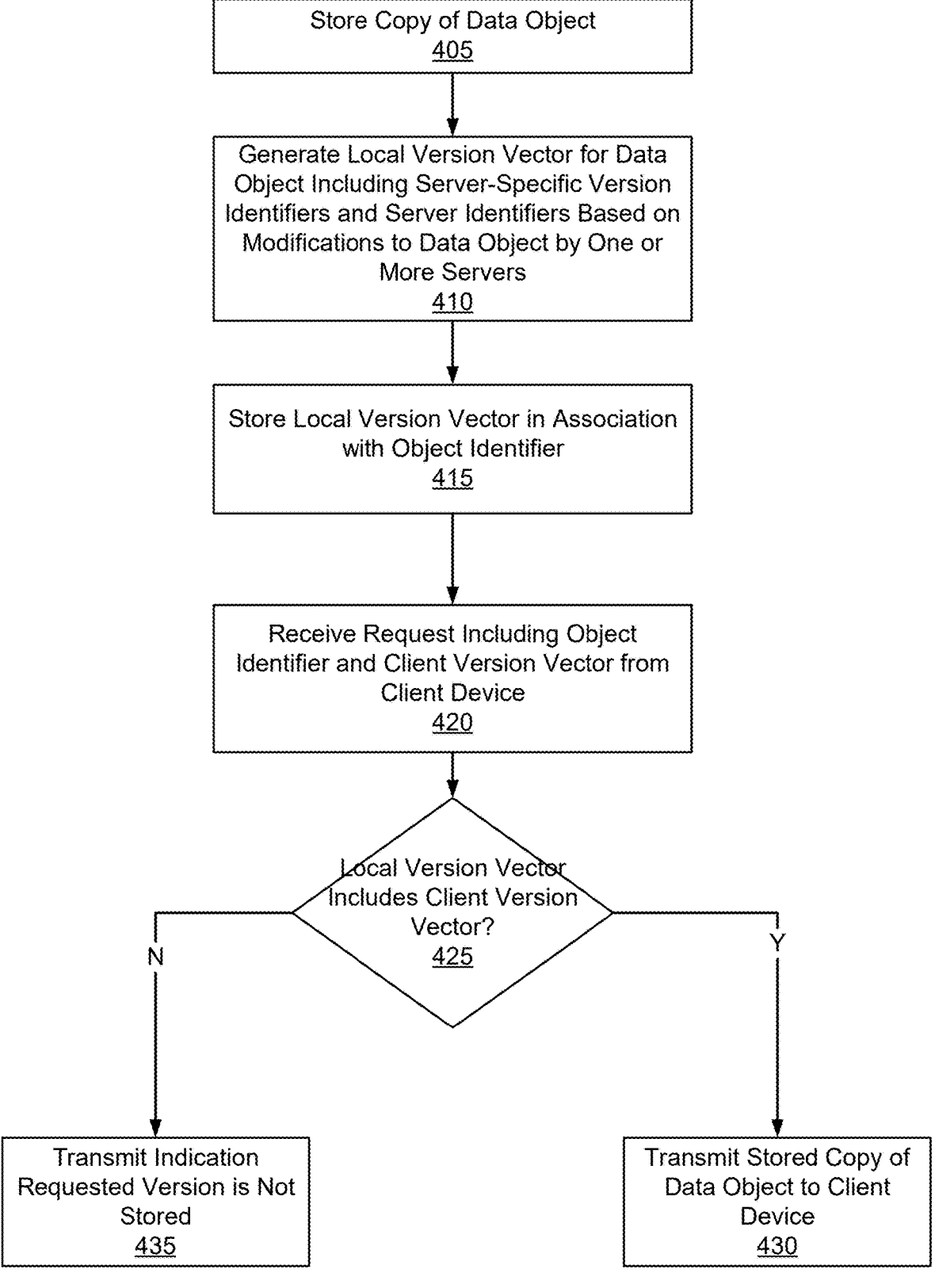

Store Copy of Data Object
405

Generate Local Version Vector for Data
Object Including Server-Specific Version
Identifiers and Server Identifiers Based on
Modifications to Data Object by One or
More Servers
410

Store Local Version Vector in Association
with Object Identifier
415

Receive Request Including Object
Identifier and Client Version Vector from
Client Device
420

Local Version Vector
Includes Client Version
Vector?
425

N

Y

Transmit Indication
Requested Version is Not
Stored
435

Transmit Stored Copy of
Data Object to Client
Device
430

FIG. 4

GENERATING A VERSION VECTOR FOR A DATA OBJECT IN A DISTRIBUTED SYSTEM TO DETERMINE WHETHER THE DATA OBJECT IS CURRENT

BACKGROUND

A distributed system includes multiple servers that communicate with each other. Each server maintains a local copy of data objects comprising data, such as documents, files, tasks, or other types of data. When a user accesses the distributed system via a client device, the client device accesses a particular server in the distributed system. For example, the distributed system has different servers in different geographic areas, and a user accesses a server in a geographic area nearest to a geographic area including the user's client device. Maintaining copies of a particular data object on multiple different servers allows a user to retrieve the data object from the distributed system regardless of which server of the distributed system is accessed.

Many distributed systems allow multiple servers to modify a data object, with a server modifying the data object propagating the modification to other servers. Each of the other servers modify locally stored copies of the data object accordingly. To improve data throughput, a distributed system allows different servers to temporarily maintain different versions of the data object while modifications to the data object are propagated to various servers. This allows a server to locally modify a copy of the data object without immediately communicating the modification to other servers and verifying the modification being successfully made to other servers when the data object is modified. However, when a client device requests the data object from a server, allowing different servers to temporarily maintain different versions of the data object prevents a server providing the data object to the client device from determining whether the server's copy of the data object for the client device has incorporated modifications to the data object made by one or more other servers. This may result in the client device obtaining an older version of the data object from the server having incomplete or outdated content.

Some conventional distributed systems provide consistency across multiple copies of a data object on different servers by having a single server modify the data object and preventing other servers from modifying the data object. However, limiting data object modification to a single server of the distributed system increases an amount of time for the data object to be modified and limits a rate at which the data object may be modified. Further limiting data object modification to a single server increases network traffic to the single server capable of modifying data objects. Other conventional distributed systems may implement cross-server transactions, where multiple servers are capable of modifying a data object, but a server that modifies a data object transmits the modifications to each other server of the distributed system when the server modifies the data object to propagate the modifications and wait for verification of successful propagation across servers. However, communicating and verifying modifications of a data object to different servers increases an amount of time for the data object to be modified across the distributed system before access by client devices, increasing an overall amount of time for the distributed system to modify the data object and increasing latency for data object modification.

Some distributed systems avoid transmitting modifications of a data object from one server to other servers of the distributed system when a server modifies the data object by adding a version to the data object. A version is a monotonic increasing value associated with an identifier of the data object. Examples of a version include a sequence number or a timestamp. The data object and a corresponding version of the data object are stored on every server of such a distributed system.

However, there are challenges for maintaining a consistent version of a data object across multiple servers of a distributed system that enables multiple servers to independently modify the data object. To create a globally comparable sequence number for a version of the data object, synchronization of the sequence number across each server requires each server to communicate with each other. If such a distributed system uses a timestamps for a version of a data object, a timestamp from one server is not comparable to timestamp from another server due to clock drifts between different servers. Accordingly, many distributed systems provide version consistency by allowing a single server to receive modifications to a data object from client devices and to store to the data object at a time. With a single server modifying a data object at a time, a single server determines a version of the data object, ensuring the version is monotonically increasing. However, limiting modification of a data object to a single server limits a rate at which the data object may be modified.

SUMMARY

In accordance with one or more aspects of the disclosure, a distributed system, such as a task management system, includes multiple servers that communicate with each other in various embodiments. Each server maintains data objects comprising data, such as documents, files, tasks, etc. When a user accesses the distributed system via a client device, the client device accesses a particular server in the distributed system. For example, the distributed system includes different servers in different geographic areas, and a user accesses a server in a geographic area nearest to the geographic area including the user's client device.

In various embodiments, the distributed system allows multiple servers to modify a common data object and propagates modifications to a data object made by one server to other servers comprising the distributed system over time. The distributed system employs one or more methods to resolve modifications to the data object made by different servers, so each server maintains a consistent version of the data object, allowing access to a common version of the data object via each server. However, various methods to resolve modifications to the data object across servers do not have the server used to modify the data object communicate the modification to other servers of the distributed system when the modification is made, resulting in different servers temporarily maintaining different versions of the data object. Allowing different servers to maintain different versions of the data object prevents a server that provides the data object to a client device from determining whether a version of the data object locally stored by the server is current or awaiting modification for consistency with a version of the data object maintained on another server of the distributed system.

Various distributed systems implement a complementary versioning system enabling different servers to determine whether a version of a data object local stored by a server includes modifications made to the data object by other servers. Such a complementary version system has a server transmit a version event to one or more client devices when the server of the distributed system modifies the data object.

For example, the server transmits the version event to client devices associated with users authorized to access the data object or to client devices satisfying one or more other criteria. Subsequently, a client device uses information included in the version event to determine whether a version of the data object retrieved from by the client device from a server includes modifications to the data object made by one or more other servers (i.e., determines if the version of the data object retrieved from the server is "current"). Such a complementary versioning system maintains a version identifier for the data object that is updated when the data object is modified by a server.

However, in distributed systems where multiple servers are capable of modifying the data object and do not communicate with each other at a time when a modification to the data object is stored, version identifiers for the data object generated by conventional complementary versioning systems may be inaccurate. For example, in a complementary versioning system using monotonically increasing sequence numbers as version identifiers, a sequence number for the data object often does not accurately reflect relative timing of when different servers modified locally stored copies of the data object. When monotonically increasing sequence numbers are used as version identifiers, unless each server modifying the data object increments a common sequence number, different combinations of per server increments to the sequence number may not be monotonically increasing. For example, a server performs two modifications to a local copy of a data object that originally has a sequence number of one; hence, the two modifications to the local copy of the data object by the server increment the version of the data object maintained by the server from one to three. In the preceding example, an additional server also performs a single modification to its local copy of the data object having a version of one, so the modification by the additional server results in the additional server maintaining a version of two for its copy of the data object. When the server and the additional server propagate their respective modifications to other servers of the distributed system, resolving the sequence number for the data object across servers may be version three based on the modifications by the server or version two based on the modifications by the additional server, which may violate having a monotonically increasing sequence number, so the sequence number for the data object does not accurately reflect relative timing of when different servers modified locally stored copies of the data object. Further, different servers of the distributed system are not temporally synchronized, so using a timestamp from a server as a monotonically increasing value to indicate modifications to a locally stored copy of the data object does not enable accurate resolution of modifications to the data object by different servers because variations between locally maintained timing information (e.g., clocks) by different servers prevents accurate determination of a relative temporal order of modifications to the data object by different servers.

For a distributed system to maintain consistency of versions of a data object maintained by different servers, a server stores a copy of the data object, with other servers of the distributed system also storing copies of the data object. To track modification of the data object, the server generates a local version vector comprising multiple local pairs of server identifier and server-specific version identifier from that server for the data object that identifies prior modifications to the data object by one or more servers of the distributed system. The local version vector is stored by the server to provide a record of modifications to the copy of the data object obtained by the server. A modification to the copy of the data object may be performed by the server performing one or more modifications to the copy of the data object provided to the server and storing an updated local version vector of the copy of the data object after performing the modifications. Alternatively, the server receives an updated version of the data object and stores the received updated version in the local pair of server identifier and server-specific version identifier for the server receiving the updated version of the data object in the local version vector of the data object. A server can store a received modification to the data object from an additional server corresponding to a pair of an identifier of the additional server and the additional server-specific version identifier from the additional server; however the server cannot modify the data object and associate the modified data object with a local pair including the server identifier for the additional server and a server-specific version identifier generated by the server in the distributed system. Hence, a server modifying the data object is prevented from including a server identifier corresponding to another server in a pair of server identifier and server-specific version identifier generated by the server modifying the data object. Limiting a server to including its own server identifier in a pair of server identifier and server-specific version identifier ensures each pair of server identifier and server-specific version is created and updated by a single server, preventing a possibility of version update inconsistency from multiple servers.

Multiple different servers may modify their locally stored copy of the data object and their own local pair of server identifier and server-specific version identifier in their local version vector. A server modifying its locally stored copy of the data object propagates the locally made data modifications and the pair of updated server-specific version identifier for the modified data object by the server and the server identifier of the server to other servers so each server of the distributed system maintains a common version of the data object (i.e., so each server of the distributed system maintains a local copy of the data object that includes one or more modifications to the data object by other servers) and a local version vector with updated with pairs of server identifiers and corresponding server-specific version identifiers from different servers making modifications to the data object. A server modifying a locally stored copy of the data object generates a server-specific version identifier stored in a local pair in conjunction with the server identifier of the server in a local pair of the local version vector for the copy of the data object locally maintained by the server. The server stores the server-specific version identifier in association with an object identifier of the data object. In some embodiments, the server-specific version identifier is a timestamp from a timing system (e.g., a clock) local to the server corresponding to a time when the server locally stored an updated version of a local copy of the data object. Alternatively, the server-specific version identifier is a monotonically increasing sequence number that the server increments by one (or by another fixed value) when the server locally stores an updated version of a local copy of the data object.

When the server of the distributed system stores the copy of the data object, the server generates a local version vector including one or more local pairs of a server identifier and a local server-specific version identifier generated by a server corresponding to the server identifier. A local pair in the local version vector includes a server identifier of a server from which the server received one or more modifications to the data object and a local server-specific version identifier generated by the server from which the one or more modifications were obtained (e.g., a timestamp generated by the server from which the one or more modifications were obtained, a sequence number generated by the server from which the one or more modifications were obtained). When a server receives one or more modifications to a data object from other servers, the server may use one or more methods to combine the multiple data modifications and to update the local copy of the data object. Along with the modifications to the data object, a server also receives one or more pairs of server identifier and server-specific version identifiers from other servers making data modifications. The server updates the local version vector with the received pairs of server identifiers and corresponding server-specific version identifiers by adding a new local pair including a server identifier of a server from which modifications were received and a corresponding server-specific version identifier of the server from which modifications were received if the local version vector does not include the server identifier of the server from which modifications were received or by updating the server-specific version for an existing local pair that includes the server identifier of the server from which modifications were received included in a received pair. The server does not update its local copy of a data object with modifications received from an additional server unless a server-specific version identifier in a received pair including the server identifier of the additional server is more recent than a server-specific version in a local pair of the local version vector that includes the identifier of the additional server. This ensures all server-specific versions are monotonically increasing. A server from which the one or more modifications were obtained may be the server itself or an additional server. The local version vector includes a local pair corresponding to each server from which one or more modifications to the data object were obtained. In various embodiments, when generating the local version vector, the server maintains a single local server-specific version identifier for each server from which the server obtained one or more modifications to the data object. For example, each local pair of the local version vector includes a server identifier of a server from which the server obtained one or more modifications to the data object and a server-specific version identifier most recently received from the server from which the server obtained one or more modifications to the data object.

The server stores the local version vector in association with the object identifier for the data object to identify modifications to the data object that the server has obtained from one or more servers. As modifications to the data object together with the pairs of server identifiers and server-specific version identifiers made by other servers take varying amounts of time to reach the server for modifying the copy of the data object and the local version vector stored by the server, having a local pair in the local version vector for each server from which the server obtained one or more modifications to the data object and corresponding local server-specific version identifier from the server from which the server obtained one or more modifications to the data object enables the server to identify whether particular modifications to the data object have been incorporated into the copy of the data object maintained by the server.

Subsequently, the server receives a request from a client device to retrieve the copy of the data object. The client version vector includes one or more client pairs that each include a server identifier and a client server-specific version identifier the client device 100 received from the server corresponding to the server identifier. A server identifier in a client pair of the client version vector corresponds to a server from which the client device received an event notification including the object identifier. When a server stores an updated version of the data object, the server transmits an event notification to one or more client devices. For example, the server transmits a version event to client devices associated with users for whom the distributed system maintains attributes allowing the users to access the data object. The event notification includes the server identifier of the server storing the updated version of the data object and server-specific version of the data object generated by the server storing the updated version of the data object.

Based on version events received from one or more servers, the client device (or an intermediate server of the distributed system) generates a client version vector. The client version vector includes a client pair for each server identifier from which the client device received a version event and corresponding client server-specific version included in the version event. When a version event is received from a server, the client device adds a new client pair including the server identifier and server-specific version identifier in the version event to the client version vector or updates an existing client pair including the server identifier to include the server-specific version identifier from the version event. When updating a client pair, the client device does not update the client pair if the server-specific version identifier included in the version event from the event is more recent than the existing server-specific version identifier stored in a client pair including the server identifier included in the version event. This results in a server-specific version identifier that is monotonically increasing for a server identifier even if the client device receives version events may arrive out of order (e.g., an older version event having a lower server-specific version identifier arrives later than a newer version event with a higher server-specific version identifier from a server making two modifications). Hence, the client version vector establishes a most recent record of versions of the data object identified to the client device by one or more servers of the distributed system.

In response to receiving the request including the object identifier and the client version vector, the server determines whether the local version vector the server associated with the object identifier includes the client version vector. The server determines whether the local version vector includes the client version vector by comparing client pairs in the client version vector to local pairs in the local version vector. For example, the server determines whether each client pair in the client version vector includes a server identifier that is in a local pair of the local version vector on the server has a server-specific version identifier in the local pair that is at least as recent as the server-specific version identifier in the client pair having the server identifier. The server performs the preceding comparison for each client pair included in the client version vector to one or more local pairs in the local version vector to determine whether the local version vector includes the client version vector.

For example, the server determines whether each server identifier included in a client pair of the client version vector is included in the local version vector. In response to determining the local version vector each server identifier included in a client pair from the client version vector, the server determines whether a local pair in the local version vector having the server identifier included in the client pair includes a local server-specific version identifier that is at least as recent as a client server-specific version identifier included in the client pair having the server identifier. A local server-specific version identifier in the local version vector is at least as recent as a client server-specific version identifier in the client version vector in response to the local server-specific version identifier equaling or exceeding the client server-specific version identifier. For example, a server-specific version identifier is a monotonically increasing sequence number, so a local server-specific version identifier being a local sequence number equaling or exceeding a client server-specific version identifier that is a client sequence number indicates the local version vector includes the client version vector. Similarly, a server-specific version identifier is a timestamp, so a local server-specific version identifier that is a time that is not earlier than a time comprising the client server-specific version identifier in the client version vector indicates the local version vector includes the client version vector.

In response to the local version vector including each server identifier included in the client version and in response to each local pair in the local version vector having a server identifier includes a local server-specific version identifier that is at least as recent as a client server-specific version identifier included in a client pair in the client version having the server identifier, the server determines the local version vector includes the client version vector. In response to determining the local version vector includes the client version vector, the server determines that the locally stored copy of the data object includes at least the modifications to the data object identified to the client device by the version events. Hence, the server transmits the stored copy of the data object to the client device. Having the local version vector include the client version vector indicates that the copy of the data object stored by the server has previously been modified to include at least the modifications identified to the client device via version events, so the copy of the data object stored by the server is current relative to the version events received by the client device.

However, in response to the server determining the local version vector does not include the client version vector, the server transmits an indication to the client device that the copy of the data object stored by the server does not include one or more of the modification previously identified to the client device by version events. For example, the server determines the local version vector does not include the client version vector in response to at least one local pair in the local version vector that has a server identifier included in the client version vector and having a local server-specific version identifier that is older than a client server-specific version identifier a client pair of client version vector including the server identifier. Similarly, the server determines the local version vector does not include client version vector in response to the client version vector including at least one server identifier that is not included in the local version vector.

Having a server of a distributed system generate a local version vector including local pairs identifying one or more servers from which the server obtained modifications to a data object and server-specific version identifiers generated by each of the one or more servers from which the server obtained modifications to the data object allows the server to maintain a record of modifications to the data object received by the server. This allows multiple servers of the distributed system to modify locally stored copies of the data object, and for servers to propagate locally made modifications to a copy of the data object and the corresponding pair of server identifier and server-specific version identifier to other servers, providing a consistent version of the data object accessible independent of which server of the distributed system is used to access the data object. Additionally, generation of the local version vector by a server that modifies the data object allows multiple servers to modify the data object without communicating the modifications to each other when the data object is modified, increasing a rate at which the data object may be modified by the distributed system. Further, because the local version vector includes multiple local pairs of server identifiers and limits a server to modifying a server-specific version identifier included in a local pair including the server identifier of the server, the local version vector mitigates potential inconsistency in creating monotonically increasing version identifiers by different servers by removing potential inconsistencies between relative timing of modifications to the data object by different servers because of variations in locally maintained clocks, locally generated sequence numbers, or other timing information, between different servers.

In various embodiments, the client device transmits an additional request for the data object to the server in response to receiving the indication that the server does not include a current version of the data object. The client device waits an amount of time after receiving the indication before transmitting the additional request. The amount of time the client device waits before sending the additional request is a predetermined amount of time specified by an application executing on the reading client device for accessing the distributed system in some embodiments. As another example, the indication includes an amount of time for the reading client device to wait before sending the additional request. Each additional request includes the client version vector from the client device for comparison by the server to the local version vector for the data object stored by the server. Alternatively, after obtaining modifications to the data object causing an updated local version vector to include the client version vector received in the request from the client device, the server transmits the modified data object to the client device.

BRIEF DESCRIPTION OF THE DRAWINGS

FIG. 4 illustrates a flowchart of a method for a server of a distributed system determining whether locally stored data is current in response to a request from a client device using a local version vector of the locally stored data, in accordance with one or more embodiments.

DETAILED DESCRIPTION

Figure 1:
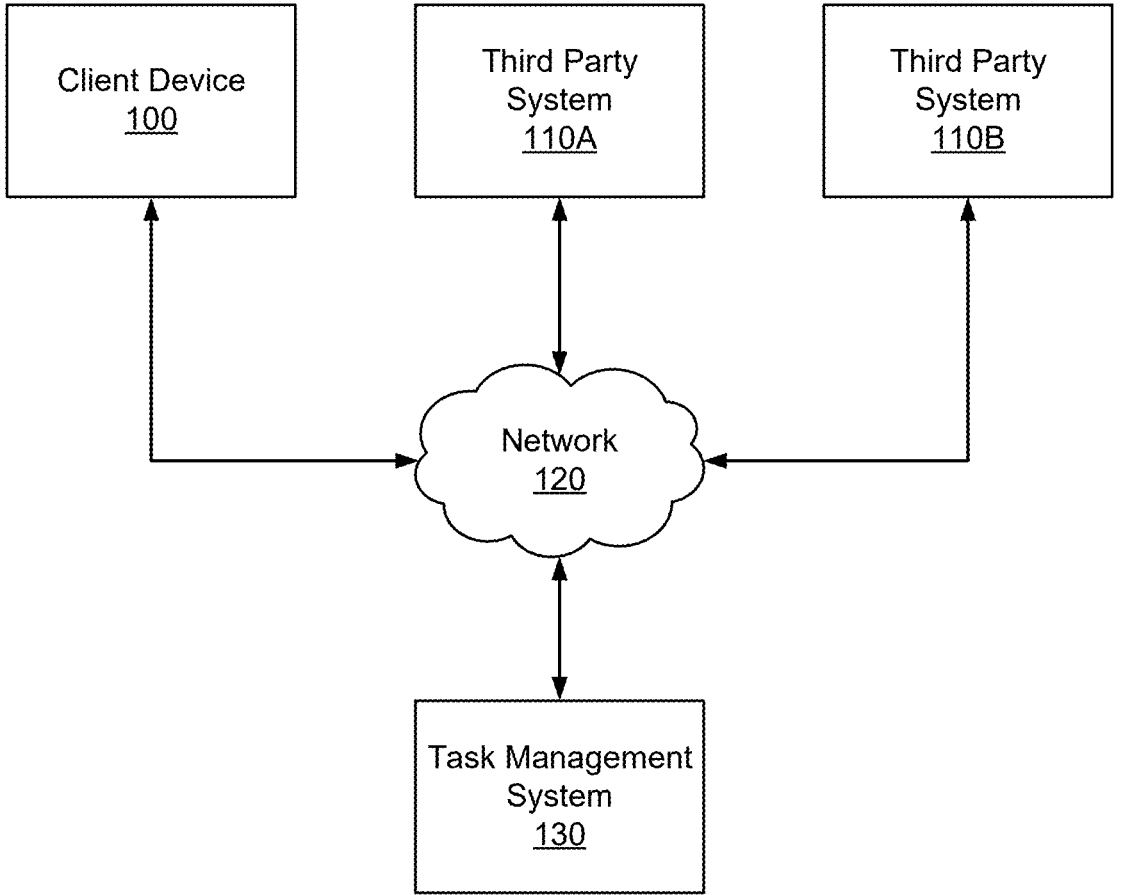
FIG. 1 illustrates an example system environment for a task management system, in accordance with one or more embodiments.

FIG. 1 illustrates an example system environment for a task management system 130, in accordance with one or more embodiments. The system environment illustrated in FIG. 1 includes a client device 100, one or more third party systems 110A, 110B (also referred to individually and collectively using reference number 110), a network 120, and a task management system 130. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

While FIG. 1 shows a single client device 100 for purposes of illustration, any number of client devices 100 may be included in the system environment. As such, there may be more than one client device 100 in various embodiments. The client device 100 is a device through which a user may interact with one or more third party systems 110 or with the task management system 130. The client device 100 can be a personal or mobile computing device, such as a smartphone, a tablet, a laptop computer, or desktop computer. In some embodiments, the client device 100 executes a task management application that uses an application programming interface (API) to communicate with the task management system 130.

Through interaction with the client device 100, a user creates one or more tasks stored by the task management system 130 via the task management application, with each task corresponding to one or more actions to be performed and a performing user to perform the one or more actions. The performing user may be the user who created the task or may be a different user. Additionally, the user may specify one or more attributes of a task. Example attributes of a task include a status of the task, a due date for the task, a priority level of the task, a resource allocation (e.g., a budget) for performing the task, one or more comments about the task, or other information relevant to performing an action corresponding to the task.

In various embodiments, the task management application executing on the client device 100 presents a workflow management interface to the user. The workflow management interface is a user interface that receives input from the user to identify or create tasks, generate a list of related tasks, generate a hierarchy of tasks, associate a task with a performing user, modify one or more attributes of a task, or perform other interactions affecting one or more tasks. In various embodiments, the workflow management interface allows the user to search for tasks satisfying one or more attributes that are identified by task management system 130 and accessible to the user. Additionally, the workflow management interface includes one or more messaging elements allowing the user to provide messages for transmission to one or more receiving users of the task management system 130.

The client device 100 may receive additional content from the task management system 130 to present to a customer. For example, the client device 100 may receive one or more messages for presentation to the user. As another example, the client device receives notifications from the task management system 130 and presents the notifications to the customer. A notification may indicate a change to an attribute of a task associated with the user (e.g., a change in a status of the task).

In some embodiments, the task management application also generates and presents a communication interface to the user that allows the customer to communicate messages to the task management system 130, to a receiving user of the task management system 130, or to a third party system 110. A message may include text data, audio data, image data, video data, or any combination thereof. For example, a message is a text message or a chat message. The client device 100 transmits a message via the network 120 and may receive one or more message via the network 120. In some embodiments, the communication interface may allow the user of the client device 100 and another user to communicate through audio or video communications, such as a phone call, a voice-over-Internet-Protocol call, or a video call.

A third party system 110 is a computing system separate from the task management system 130 that interacts with the task management system 130 or with the client device 100. In various embodiments, different third party systems 110A, 110B provide different types of content to the task management system 130 or to the client device 100. For example, a third party system 110 is an application provider communicating information describing one or more applications for execution by a client device 100 or communicating data to a client device 100 for use by an application executing on the client device 100. In other embodiments, a third party system 110 provides content or other information for presentation via a client device 100. A third party system 110 may also communicate information to the task management system 130, such as files, documents, metadata, or other information to the task management system 130.

The client device 100, the one or more third party systems 110, and the task management system 130 can communicate with each other via the network 120. The network 120 is a collection of computing devices that communicate via wired or wireless connections. The network 120 may include one or more local area networks (LANs) or one or more wide area networks (WANs). The network 120, as referred to herein, is an inclusive term that may refer to any or all of standard layers used to describe a physical or virtual network, such as the physical layer, the data link layer, the network layer, the transport layer, the session layer, the presentation layer, and the application layer. The network 120 may include physical media for communicating data from one computing device to another computing device, such as MPLS lines, fiber optic cables, cellular connections (e.g., 3G, 4G, or 5G spectra), or satellites. The network 120 also may use networking protocols, such as TCP/IP, HTTP, SSH, SMS, or FTP, to transmit data between computing devices. In some embodiments, the network 120 may include BLUETOOTH® or near-field communication (NFC) technologies or protocols for local communications between computing devices. The network 120 may transmit encrypted or unencrypted data.

The task management system 130 is an online system by which users identify tasks specifying actions to be performed, identify a performing user to perform an action identified by a task, and specify attributes of the task. The task management system 130 maintains associations between users and tasks. For example, the task management system 130 stores an association between a task identifier of a task and one or more user identifiers of users, such as a user who identified the task and one or more performing users associated with the task. The task management system 130 receives modifications to one or more attributes of a task from a user associated with the task, and updates the attributes of the task based on the received modifications. Additionally or alternatively, the task management system 130 may modify one or more attributes of a task based on information describing actions performed by a user. The task management system 130 transmits a notification to a client device 100 of a user associated with a task in response to an attribute of the task being modified, allowing a user associated with the task to remain informed of changes to one or more attributes of the task.

In various embodiments, the task management system 130 is a distributed system including multiple servers that communicate with each other via the network 120. Servers of the task management system 130 may be in different locations. For example, the task management system 130 includes servers in different geographic locations. When accessing the task management system 130, different client devices 100 may access different servers, or a client device 100 may access different servers when accessing the task management system 130 at different times.

As further described below in conjunction with FIGS. 3 and 4, because a client device 100 may access different servers comprising the task management system 130 at different times, each server of the task management system 130 maintains a local copy of a data object, enabling a client device to retrieve the data object regardless of which server is accessed. However, in various embodiments, the task management system 130 allows multiple servers to modify a common data object. A server modifying a local copy of the data object subsequently propagates the modifications to the data object to other servers of the task management system 130. In various embodiments, the task management system 130 users one or more methods to resolve modifications to the data object made by different servers so each server maintains a consistent version of the data object, allowing access to a common version of the data object via each server.

However, various methods to resolve modifications to the data object across servers do not have the server used to modify the data object communicate the modification to other servers of the distributed system when the modification is made, resulting in different servers temporarily maintaining different versions of the data object. Allowing different servers to maintain different versions of the data object prevents a server that provides the data object to a client device 100 from determining whether a version of the data object locally stored by the server is current or awaiting modification for consistency with a version of the data object maintained on another server of the distributed system. To allow a server to determine whether a locally maintained copy of a data object is current (i.e., includes prior modifications to the data object made by one or more servers), the server maintains a local version vector for the data object. As further described below in conjunction with FIGS. 3 and 4, the local version vector includes one or more local pairs, with each local pair including a server identifier of a server from which one or more modifications to the data object was received and a local server-specific version identifier that was generated by the server from which one or more modifications to the data object was received.

When a client device 100 requests the data object from the server, the client device 100 includes a client version vector in the request along with the object identifier of the data object. As further described below in conjunction with FIGS. 3 and 4, the client version vector includes one or more client pairs, with each client pair including a server identifier of a server from which the client device 100 received a version event indicating a modification to the data object and a client server-specific version identifier that was generated by the server from which the client device 100 received the version event indicating a modification to the data object. The server determines whether the local version vector for the copy of the data object includes the client version vector, as further described below in conjunction with FIGS. 3 and 4. In response to determining the local version vector for the copy of the data object includes the client version vector, the server transmits the copy of the data object from the server to the client device 100. However, in response to determining the local version vector for the copy of the data object does not include the client version vector, the server transmits an indication to the client device 100 that the copy of the data object accessible via the server is not current (i.e., the copy of the data object does not include one or more modifications identified by the client version vector).

Additionally, the task management system 130 may generate one or more interfaces for a user associated with one or more tasks. For example, an interface identifies tasks associated with a user and identifies at least a set of attributes of the tasks, allowing the user to readily review and identify attributes of different tasks. The interface may identify relationships between tasks or between tasks and one or more sub-tasks of a task identified by a user, allowing a user to visualize relationships between different tasks. Further, the task management system 130 may store files or other data associated with a task or store information from retrieving files or data associated with the task from a third party system 110 to simplify access to data for reviewing or for performing a task for a user. The task management system 130 is described in further detail in conjunction with FIG. 2.

Figure 2:
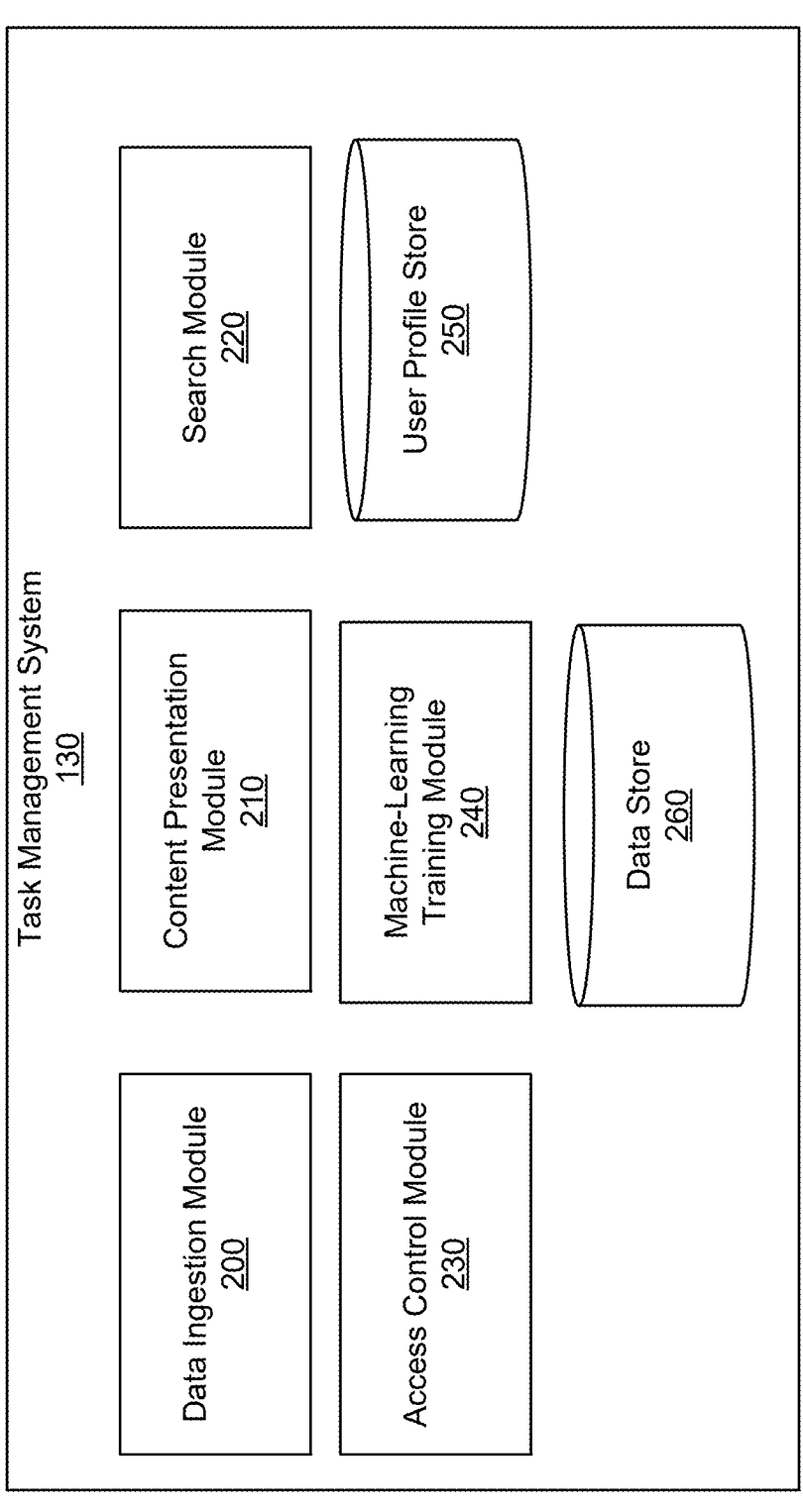
FIG. 2 illustrates an example system architecture for a task management system, in accordance with one or more embodiments.

FIG. 2 illustrates an example system architecture for a task management system 130, in accordance with some embodiments. The system architecture illustrated in FIG. 2 includes a data ingestion module 200, a content presentation module 210, a search module 220, an access control module 230, a machine learning training module 240, a user profile store 250, and a data store 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data ingestion module 200 collects data used by the task management system 130 and stores the data in the user profile store. For example, the data ingestion module 200 receives information from a user creating a task, including one or more attributes of a task, or instructions for modifying one or more attributes of a task. Additionally, the data ingestion module 200 receives information from a user including characteristics of a user for inclusion in a corresponding user profile. The data ingestion module 200 may encrypt some or all of the obtained data, such as certain data describing a user.

In various embodiments, the data ingestion module 200 generates a version vector for a data object, or for a copy of a data object that identifies modifications to the data object that have been identified to the data ingestion module 200. As further described below in conjunction with FIGS. 3 and 4, the version vector includes a server identifier of a server of the task management system 130 from which modifications to the data object were received and a server-specific version identifier locally generated by the server from which the modifications were received. The data ingestion module 200 locally generates the server-specific identifier for a server that stored modifications to the data object. As further described below in conjunction with FIGS. 3 and 4, the data ingestion module 200 generates the version vector for a data object by combining pairs of server identifiers and corresponding server-specific version identifiers obtained from various servers of the task management system 130 for the data object. The data ingestion module 200 stores the version vector in association with an object identifier for the data object.

The data ingestion module 200 also receives data describing relationships between tasks. For example, a user may identify one or more discrete sub-tasks that correspond to different portions of a task. Further, the data ingestion module 200 may receive data describing a hierarchy of tasks. For example, the data ingestion module 200 receives an identifier of a list from a user along with identifiers of one or more tasks to associate with the list. Hence, the list includes one or more tasks, allowing a user to organize related tasks, tasks related to a common objective, or tasks having one or more other common criteria. Additionally hierarchical information may be specified in some embodiments. For example, the data ingestion module 200 receives an identifier of a category and identifiers of one or more lists associated with the category, allowing a user to generate a grouping of lists, and the tasks included in the lists. As further described below, the data ingestion module 200 stores information describing relationships between tasks in the data store 260.

Additionally, the data ingestion module 200 captures interactions by users with tasks and stores the interactions in an interaction log included in the data store 260. In various embodiments, when a user interacts with a task through the task management system 130, the data ingestion module 200 determines an identifier of the user, an identifier of the task with which the user interacted, a time when the interaction occurred, and a description of the interaction by the user with the task. When the interaction with a task modifies an attribute of the task, the description of the interaction by the user includes an identifier of the attribute of the modifier of the task and a modified value of the task. In some embodiments, the description of the interaction includes an indication that the interaction changed at least one attribute of the task. Capturing interactions by users with tasks allows the data ingestion module 200 to generate an interaction log in the data store 260 that may be used to subsequently identify modifications to attributes of a task or a history of how one or more users interacted with a task. This may be leveraged to generate a record of how one or more users interacted with one or more tasks over time.

The content presentation module 210 selects content for presentation to a user and generates one or more interfaces for displaying the content to the user. In various embodiments, the content presentation module 210 receives a request for content from the user including one or more criteria, selects one or more tasks having characteristics satisfying one or more of the criteria, and generates an interface displaying information about the selected one or more tasks to a user. The content presentation module 210 generates instructions for transmission to a client device 100, which executes the instructions to generate an interface presenting the information about the selected one or more tasks. In various embodiments, the request from the user includes display instructions specifying how an interface presents information about the selected one or more tasks. For example, a request specifies a calendar view, so the content presentation module 210 generates an interface displaying information about one or more tasks on a calendar, with the calendar displaying information identifying a task, and one or more characteristics of the task, in a portion of the calendar corresponding to a date associated with the task. As another example, a request includes a specific attribute of a task, and the content presentation module 210 selects tasks having the specific attribute and generates instructions for an interface presenting the selected tasks.

The search module 220 receives a search query from the client device 100 and retrieves search results comprising tasks, or other data object, with attributes at least partially satisfying the search query. Data objects may be documents, video files, audio files, or other files accessible to the search module 220. A search query is text for a word or set of words that indicate attributes of a task or another data object. In various embodiments, the search module 220 generates a score for each task, or other data object, at least partially satisfying the search query and presents the search results based on their corresponding scores. For example, the search module 220 scores tasks or other data objects based on a measure of relevance of a task or a data object to a search query. For example, the search module 220 applies natural language processing (NLP) techniques to text in the search query to generate a search query embedding representing characteristics of the search query. The search module 220 may use the search query embedding to score candidate items for presentation to a customer (e.g., by comparing a search query embedding to an item embedding).

In some embodiments, a user authorizes the task management system 130 to access information associated with the user and stored by a third party system 110. In various embodiments, the search module 220 stores authentication information for the third party system 110 corresponding to the user in association with an identifier of the user and an identifier of the third party system 110. The authentication information for the third party system 110 may be a combination of a username and password or other authentication information for the user to access the third party system 110. In various embodiments, when the task management system 130 receives a search query from the user, the task management system, through one or more application programming interfaces (APIs), the search module 220 transmits the search query to the third party system 110 and retrieves files or other content items from the third party system 110 that at least partially satisfy the search query. This allows the search module 220 to evaluate both locally stored data in the data store 260 and data maintained by a third party system 110 for the user for search results, allowing the search module 220 to provide search results accounting for data associated with the user from one or more third party systems 110 that the user authorized the task management system 130 to access.

The access control module 230 regulates access to tasks by various users. When a user accesses the task management system 130, the access control module 230 retrieves a user profile of the user from the user profile store 250. Based on one or more permissions in the user profile, the access control module 230 identifies a subset of tasks from the data store 260 for the user based on the one or more permissions. For example, the access control module 230 identifies a subset of tasks that one or more permissions of the user authorize the user to access. Tasks in the subset may be presented to the user or be otherwise accessible to the user, while tasks in the data store 260 and not in the subset are inaccessible to the user. Hence, the access control module 230 to regulate access to stored tasks for different users, Similarly, for a task, the access control module 230 determines a set of interactions a user is authorized to perform with the task based on one or more permissions in the user profile of the user. For example, a user with a first type of permission is authorized to modify one or more attributes of a task, while another user with a different type of permission is authorized to view the attributes of the task but is unable to modify one or more attributes of the task. As another example, one or more permissions of the user authorize the user to modify a set of attributes of the task, while preventing the user from modifying attributes that are not included in the set. The access control module 230 may receive permissions or modifications to permissions of a user from the user or from another user and store the permissions or the modified permissions in a user profile corresponding to the user. This allows the access control module 230 to regulate types of interactions with a task based on permissions of a user, enabling different users to perform different types of interactions with different tasks.

The machine learning training module 240 trains machine learning models used by the task management system 130. The task management system 130 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 240 generates the set of parameters for a machine learning model by "training" the machine learning model. Once trained, the machine learning model uses the set of parameters to transform inputs into outputs.

The machine learning training module 240 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 240 may apply an iterative process to train a machine learning model whereby the machine learning training module 240 trains the machine learning model on each of the set of training examples. To train a machine learning model based on a training example, the machine learning training module 240 applies the machine learning model to the input data in the training example to generate an output. The machine learning training module 240 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 240 updates the set of parameters for the machine learning model based on the score generated by the loss function. For example, the machine learning training module 240 may apply gradient descent to update the set of parameters.

In various embodiments, the machine learning training module 240 tunes one or more generative models that receive a text prompt and generate content based on the text prompt. A generative model is a large language model (LLM), such as a generative pre-trained transformer model (GPT) in various embodiments. The generative model may generate text in response to a text prompt in various embodiments. Alternatively or additionally, the generative model selects or generates an image in response to a text prompt. A generative model is model pre-trained on a text corpus including text to output text in response to a text prompt from a user. As another example, a generative model is a generative image model pre-rained on a corpus of images to output an image in response to a received text prompt. Obtaining a pre-trained generative model allows the machine learning training module 240 to leverage relationships between different text (or images) the generative model learned through application to a text corpus or image corpus including a larger amount of data and more varied data than the task management system 130 maintains.

In various embodiments, the machine learning training module 240 generates examples for inclusion in a prompt input to a generative model. An example includes an input to the generative model and an expected output in response to the input. For example, an example includes input text and output text along with formatting instructions for the output text. When applying a generative model to input, the task management system 130 (e.g., the content presentation module 210) generates a prompt for the generative model that includes the input and one or more examples generated by the machine learning training module 240. This allows the example included in the prompt to specify a format or content of the output of the generative model based on the input. In some embodiments, the machine learning training module 240 generates a GPT index including embeddings corresponding to example to facilitate identification and retrieval of one or more supplemental examples based on an embedding of an input to a generative model. The machine learning training module 240 stores the GPT index including the supplemental examples, or the embeddings for the supplemental examples in various embodiments.

The user profile store 250 includes a user profile corresponding to each user of the task management system 130. A user profile of a user includes a user identifier of a corresponding user, characteristics of the user, contact information for the user, or other descriptive information about the user. In various embodiments, the user profile of the user includes task identifiers of tasks associated with the user. Further, in some embodiments, the user profile of the user includes one or more permissions of the user. One or more permissions included in the user profile of a user identify types of interactions the user is permitted to perform with one or more tasks. Different permissions may correspond to different tasks, allowing the user to perform different types of interactions with different tasks. A user profile may also maintain references to interactions by the corresponding user performed on one or more tasks and stored in an interaction log in the data store 260. This allows the user to review or to identify one or more interactions the user previously performed with tasks.

The data store 260 stores data used by the task management system 130. For example, the data store 260 stores tasks created by a user. In various embodiments, the data store 260 includes a task log that includes a task identifier for each task with corresponding attributes of a task associated with the task identifier. For example, the task log includes a task identifier for a task with attributes of the task associated with the task identifier. As further described above, example attributes of the task include: an identifier of a user to perform the task, a status of the task, a due date for the task, a priority level of the task, a resource allocation (e.g., a budget) for performing the task, one or more comments about the task, or other information relevant to performing an action corresponding to the task.

Additionally, the data store 260 stores an interaction log describing interactions by users with the task management system 130. The interaction log includes entries including a task identifier, a user identifier of a user who performed an interaction, a time when the interaction was performed, and a description of the interaction. The description of the interaction may be a type of the interaction and may include data received through the interaction. For example, an interaction is a comment on a task, and a description of the interaction includes a type indicating a comment and text data comprising the comment. In various embodiments, the interaction log organizes entries chronologically, while in other embodiments, the interaction log may organize entries using other formats.

The data store 260 also stores trained machine learning models trained by the machine learning training module 240. For example, the data store 260 may store the set of parameters for a trained machine learning model on one or more non-transitory, computer-readable media. As another example, the data store 260 stores parameters comprising a previously trained model that the machine learning training module 240 obtained from a third party system 110 or from another source. For example, the data store 260 includes a generative model, such as a large language model (LLM) that the machine learning training module 240 obtained from a third party system 110. The data store 260 may also include one or more examples that a machine learning model, such as a generative model receives as input. The data store 260 uses computer-readable media to store data, and may use databases to organize the stored data.

Figure 3:
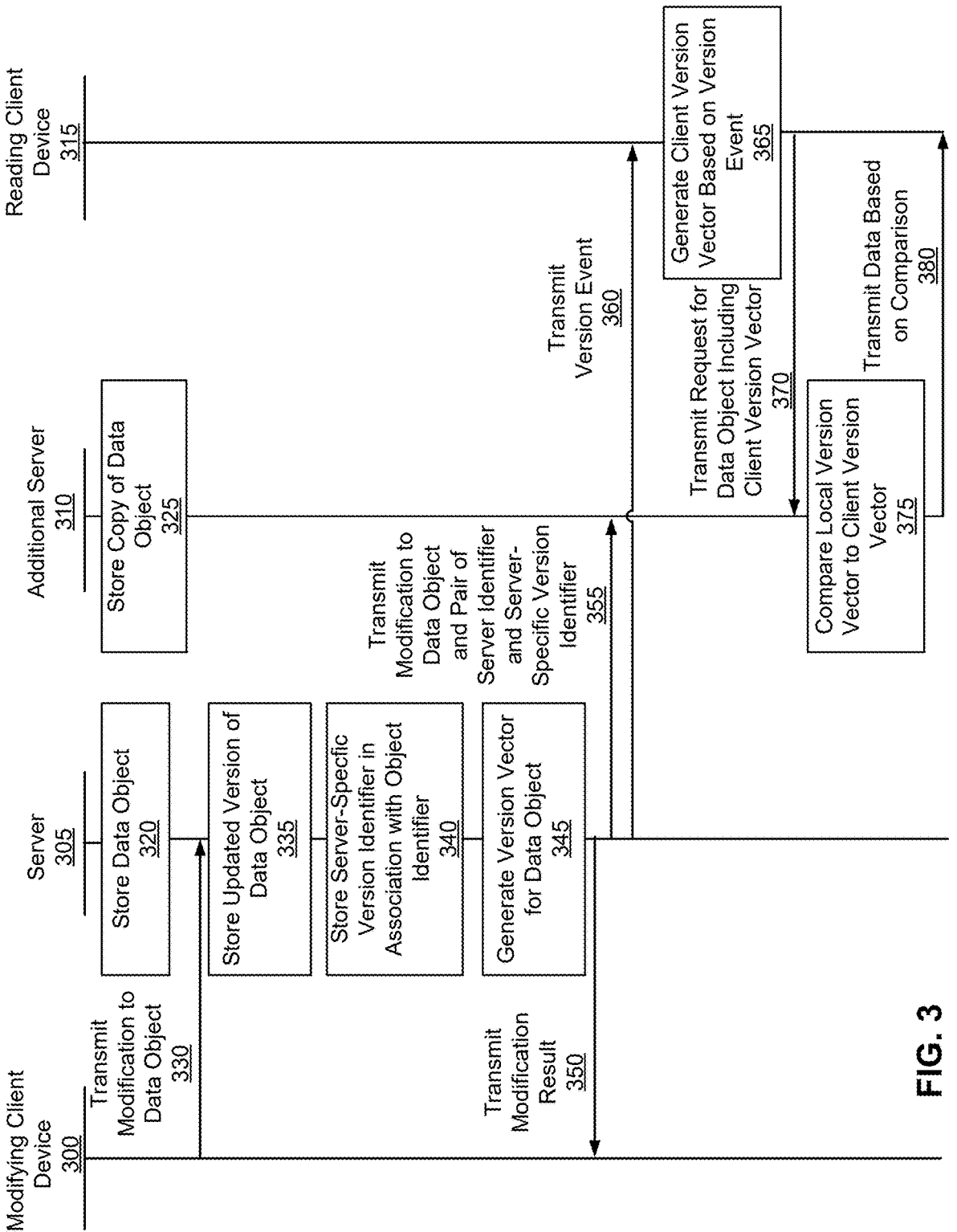
FIG. 3 illustrates an interaction diagram of a method for determining whether data stored in a server of a distributed system includes modifications to the data by another server of the distributed system, in accordance with one or more embodiments.

FIG. 3 is an interaction diagram of a method for determining whether data stored in a server of a distributed system includes modifications to the data by another server of the distributed system, in accordance with some embodiments. Alternative embodiments may include more, fewer, or different steps from those illustrated in FIG. 3, and the steps may be performed in a different order from that illustrated in FIG. 3. These steps may be performed by servers of the task management system 130, or by another online system, in various embodiments. Additionally, each of these steps may be performed automatically by servers of the task management system 130 without human intervention.

A distributed system, such as the task management system 130 further described above in conjunction with FIGS. 1 and 2, includes multiple servers that communicate with each other in various embodiments. Each server maintains data objects comprising data, such as documents, files, tasks, etc. When a user accesses the distributed system via a client device 100, the client device 100 accesses a particular server in the distributed system. For example, the distributed system includes different servers in different geographic areas, and a user accesses a server in a geographic area nearest to the geographic area including the user's client device 100.

In various embodiments, the distributed system allows multiple servers to modify a common data object and propagates modifications to a data object made by one server to other servers comprising the distributed system over time. The distributed system employs one or more methods to resolve modifications to the data object made by different servers so each server maintains a consistent version of the data object, allowing access to a common version of the data object via each server. However, various methods to resolve modifications to the data object across servers do not have the server used to modify the data object communicate the modification to other servers of the distributed system when the modification is made, resulting in different servers temporarily maintaining different versions of the data object. Allowing different servers to maintain different versions of the data object prevents a server that provides the data object to the a client device 100 from determining whether a version of the data object locally stored by the server is current or awaiting modification for consistency with a version of the data object maintained on another server of the distributed system.

Various distributed systems implement a complementary versioning system enabling different servers to determine whether a version of a data object local stored by a server includes modifications made to the data object by other servers. Such a complementary version system has a server transmit a version event to one or more client devices 100 when the server of the distributed system modifies the data object. For example, the server transmits the version event to client devices 100 associated with users authorized to access the data object or to client devices 100 satisfying one or more other criteria. Subsequently, a client device 100 uses information included in the version event to determine whether a version of the data object retrieved from by the client device 100 from a server includes modifications to the data object made by one or more other servers (i.e., determines if the version of the data object retrieved from the server is "current"). Such a complementary versioning system maintains a version identifier for the data object that is updated when the data object is modified by a server. However, in distributed systems where multiple servers are capable of modifying the data object and do not communicate with each other at a time when a modification to the data object is stored, version identifiers for the data object generated by conventional complementary versioning systems may be inaccurate. For example, in a complementary versioning system using monotonically increasing sequence numbers as version identifiers, a sequence number for the data object often does not accurately reflect relative timing of when different servers modified locally stored copies of the data object. Further, different servers of the distributed system are not temporally synchronized, so storing a timestamp from a server indicating when the server modified a locally stored copy of the data object does not enable accurate resolution of modifications to the data object by different servers because variations between locally maintained timing information (e.g., clocks) by different servers prevents accurate determination of a relative temporal order of modifications to the data object by different servers.

For purposes of illustration, FIG. 3 shows an example distributed system including a server 305 and an additional server 310. The server 305 and the additional server 310 are physically separate devices in various embodiments. For example, the server 305 and the additional server 310 are in different geographic locations. However, the distributed system includes a greater number of servers than the two depicted in FIG. 3 in various embodiments.

Additionally, the example of FIG. 3 depicts a modifying client device 300 and a reading client device 315 that access servers of the distributed system. For purposes of illustration, FIG. 3 shows an example where the modifying client device 300 accesses the server 305, while the reading client device 315 accesses the additional server 310. As an example, a geographic location of the modifying client device 300 is in a geographic location nearest a geographic location of the server 305, while a geographic location of the reading client device 315 is nearest an additional geographic location of the additional server 310. This illustrates how different client devices 100 may access different servers comprising the distributed system.

The server 305 stores 320 a data object (e.g., a document, a task, a video file, an audio file, etc.), while the additional server 310 stores 325 a copy of the data object. However, in other embodiments, the server 305 stores 325 the copy of the data object, while the additional server 310 stores 320 the data object. Maintaining copies of the data object on different servers allows different client devices 100 to access the data object via the distributed system independent of which server of the distributed system is accessed.

In the example of FIG. 3, the modifying client device 300 retrieves the data object from the server 305 and performs one or more modifications to the data object. For example, the data object comprises a document, and the modifying client device 300 retrieves the document from the server 305 and modifies one or more portions of the document. The modifying client device 300 transmits 330 the one or more modifications to the server 305, which stores 335 an updated version of the data object that includes the one or more modifications. In various embodiments, the modifying client device 300 transmits 330 a modified data object including the one or more modifications made via the modifying client device 300 to the server 305, which stores 335 the modified data object as an updated version of the data object. Alternatively, the modifying client device 300 transmits 330 one or more modifications to the data object to the server 305, which incorporates the one or more modifications into the data object and stores 335 the modified data object as the updated version of the data object.

The server 305 also locally generates and stores 340 a server-specific version identifier for the updated version of the data object in association with an object identifier that uniquely identifies the data object to the distributed system. The server-specific version identifier is specific to the server 305 where it is locally generated. The server-specific version identifier provides an indication of how the server 305 modified the data object over time. In some embodiments, the server-specific version identifier comprises a timestamp locally generated by the server 305 identifying a time when the server 305 stored 335 the updated version of the data object. Alternatively, the server-specific version identifier comprises a monotonically increasing sequence number locally generated by the server 305 when the updated version of the data object is stored 335. When a monotonically increasing sequence number is the server-specific version identifier, the server 305 increments a previous sequence number for the existing version of the data object stored by the server 305 by one to generate the server-specific version identifier for the updated version of the data object.

Additionally, the server 305 locally generates 345 a version vector for the data object. The version vector includes a pair comprising the server-specific version identifier of the data object generated by the server 305 and a server identifier identifying the server 305. Additionally, the version vector may include one or more additional pairs that each comprise a server identifier of a different server from which the server 305 received one or more modifications to the data object and a server-specific version identifier of the data object locally generated by the different server from which the one or more modifications to the data object were received. When generating 345 the version vector for the data object, the server 305 appends the pair including server-specific version identifier of the data object generated by the server 305 and the server identifier of the server 305 to other pairs of different server identifiers of servers from which one or more modifications to the data object were received and corresponding server-specific version identifiers generated by the different servers from which one or more modifications to the data object were received by the server 305. In various embodiments, for a server from which the server 305 received one or more modifications to the data object, the version vector includes a pair having a server identifier of the server from which the one or more modifications were received and a most recently received server-specific version identifier of the data object from the server from which the one or more modifications to the data object were received. Hence, the version vector comprises a vector of one or more pairs of server identifiers of servers from which the server 305 obtained modifications to the data object and corresponding server-specific version identifiers for the data object locally generated by each server from which one or more modifications to the data object were received. This allows the version vector generated 345 by the server 305 to provide a record of modifications to the data object obtained by the server 305 and from which server the server 305 obtained different modifications to the data object.

After storing 335 the updated version of the data object and generating 345 the version vector for the data object, the server 305 transmits 350 a modification result to modifying client device 300 to confirm the modifications to the data object have been stored 335 by the server 305. The server 305 does not communicate with other servers or other client devices before transmitting 350 the modification result to the modifying client device 300 in various embodiments.

The server 305 transmits 355 the modifications to the data object along with an object identifier of the data object and a pair including an identifier of the server 305 and the server-specific version identifier generated by the server 305 to the additional server 310. While FIG. 3 shows the server 305 transmitting 355 the modifications to the data object and the pair including the identifier of the server 305 and the server-specific version identifier generated by the server 305 to the additional server 310, the server 305 transmits 355 the modifications to the data object and the pair including the identifier of the server 305 and the server-specific version identifier generated by the server 305 to other servers in the distributed system, such as to each server of the distributed system. This distributes the modifications to the data object that the server 305 made in response to the modifying client device 300 to other servers comprising the distributed system.

In response to receiving the modifications to the data object and the pair including the identifier of the server 305 and the server specific identifier generated by the server 305, the additional server 310 updates the copy of the data object stored 325 by the additional server 310 to incorporate the modifications from the server 305 into the copy of the data object stored 325 by the additional server 310. Additionally, the additional server 310 retrieves a local version vector stored by the additional server 310 in association with the object identifier. The local version vector includes one or more pairs each including a server identifier and a server-specific version identifier generated by a server corresponding to the server identifier. A pair in the local version vector includes a server identifier of a server from which the additional server 310 obtained a one or more modifications to the data object and a server-specific version identifier generated by the server from which the additional server 310 obtained the one or more modifications to the data object (e.g., a timestamp locally generated by the server from which the one or more modifications were obtained, a sequence number locally generated by the server from which the one or more modifications were obtained, etc.). The local version vector includes a pair corresponding to each server from which the additional server 310 obtained one or more modification to the data object. One or more modifications to the data object may be obtained by the additional server 310 modifying a locally stored copy of the data object or by the additional server 310 receiving modifications to the data object from a different server. In various embodiments, when generating the local version vector, the additional server 310 maintains a single server-specific version identifier for each server identifier of a server from which the additional server 310 obtained one or more modifications to the data object. For example, each pair included in the local version vector includes a server identifier of a server from which the additional server 310 obtained one or more modifications to the data object and a most recently received server-specific version identifier from the server from which the additional server 310 obtained the one or more modifications to the data object.

The additional server 310 updates the local version vector associated with the object identifier based on the pair including the identifier of the server 305 and the server specific identifier generated by the server 305 received from the server 305. In response to determining the local version vector maintained by the additional server 310 does not include a local pair including the server identifier of the server 305, the additional server 310 updates the local version vector by adding the pair including the identifier of the server 305 and the server specific identifier generated by the server 305 received from the server 305 to the local version vector. In response to determining the local version vector maintained by the additional server 310 includes a local pair including the server identifier of the server 305, the additional server 310 updates the local version vector by updating the server-specific version included in the local pair including the server identifier of the server 305 to the server-specific identifier included in the pair received from the server 305. Additionally, the additional server 310 does not update the copy of the data object with the modifications from the server 305 unless the server-specific version identifier in the pair received from the server 305 is more recent than a server-specific version identifier in a local pair including the server identifier of the server 305 that is in the local version vector The server 305 transmits 360 a version event to one or more other client devices 100 via the network 120, such as client devices 100 associated with other users having access to the data object via the distributed system. In the example of FIG. 3, the server 305 transmits 360 the version event to the reading client device 315. However, the server 305 transmits 360 the version event to multiple client devices 100 associated with one or more users of the distributed system in various embodiments. For example, the server 305 transmits 360 the version event to client devices 100 associated with users of the distributed system satisfying one or more criteria (e.g., users of the distributed system having permissions authorizing the users to access the data object). The version event includes an object identifier of the data object and the pair including the server identifier of server 305 and the server-specific version identifier generated by the server 305 for the data object stored 320 by the server 305. In some embodiments, the version event is limited to including the object identifier of the data object pair including the server identifier of server 305 and the server-specific version identifier generated by the server 305.

In response to receiving the version event including a pair comprising the server 305 identifier and server-specific version identifier from the server 305, the reading client device 315 locally generates 365 a client version vector for the data object in various embodiments. The client version vector includes a combination of version vectors associated with the object identifier that the client device 315 previously received from one or more servers. As the reading client device 315 may receive multiple version events from different servers that modified the data object, the client version vector provides a record of various modifications to the data object that have been identified to the reading client device 315 through one or more version events. In various embodiments, the client version vector includes a pair for each server identifier included in a version event received by the reading client device 315 that included the object identifier for the data object. The pair in the client version vector for the server 305 includes a server identifier for the server 305 and the server-specific version identifier generated by the server 305 for the data object. An additional pair in the client version vector includes an alternative server identifier of an alternative server from which the reading client device 315 received a version event and an alternative server-specific version identifier locally generated by the alternative server a copy of the data object stored by the alternative server.

To generate 365 the client version vector for the data object, the reading client device 315 accounts for version events received from one or more servers, so the client version vector includes multiple client pairs that each include a server identifier and a corresponding server-specific version identifier. In response to the reading client device 315 determining the client version vector does not include a client pair that includes the server-specific version identifier in the version event, the reading client device 315 appends the pair of the server identifier of the server 305 and the corresponding server-specific version identifier in the version event to the client version vector. In response to the reading client device 315 determining the client version vector includes a client pair that includes the server identifier from the version event, the reading client device 315 updates the client pair including the server identifier from the version event to include the server-specific version identifier included in the version event if the server-specific version identifier is more recent than the server-specific version identifier in the client pair. The reading client device 315 does not update the client version vector if the server-specific version identifier in the client pair including the server identifier of the server 305 is more recent than the server-specific version identifier included in the version event.

In various embodiments, the client version vector includes a single pair for each server identifier included in at least one version event received by the reading client device 315. For example, the reading client device 315 includes a server identifier of the server 305 and a server-specific version identifier from the server 305 included in version event from the server 305 most recently received by the reading client device 315. Hence, the client version vector comprises a vector of one or more pairs each including a server identifiers of a server from which the client device 100 received a version event including the object identifier for the data object and a corresponding server-specific version identifier generated by the server from which the client device 100 received the version event including the object identifier for the data object. This allows the client version vector to provide a record of modifications to the data object by one or more servers of the distributed system identified to the reading client device 315 via version events.

While FIG. 3 shows an example where the reading client device 315 locally generates 365 the client version vector, in other embodiments, the distributed system includes an intermediate server that generates 365 the client version vector for the data object. In such an embodiment, the intermediate server receives version events from servers and generates 365 a client version vector for the data object based on received version events including the object identifier of the data object, as further described above. Subsequently, the intermediate server transmits the client version vector to one or more client devices 100 via the network 120 to provide the client devices with a record of modifications made by one or more servers to the data object. The intermediate server receives version events transmitted to client devices from various servers and uses the server identifiers and server-specific version identifiers of the data object in the received version events including the object identifier to generate 350 the client version vector. In various embodiments, the client version vector includes a single pair of server identifier and server-specific version identifier for each server identifier included in at least one received version event including the object identifier. For example, the intermediate server includes a server identifier of the server 305 and a server-specific version identifier from the server 305 included in a version event most recently received from the server 305 in the client version vector. The intermediate server transmits the client version vector to the reading client device 315, as well as to other client devices associated with users capable of accessing the data object. This allows the intermediate server to maintain and manage client version vectors for various data objects, rather than have individual client devices locally generate 365 and update client version vectors for different data objects.

To access the data object, the reading client device 315 transmits 370 a request for the data object to the distributed system. The request includes the object identifier for the data object and the client version vector for the data object from the reading client device 315. As further described above, the reading client device 315 accesses the additional server 310 of the distributed server, rather than the server 305 that stored 335 the version of the data object with the modifications from the modifying client device 300. In response to receiving the request from the reading client device 315, the additional server 310 retrieves the local version vector stored by the additional server 310 in association with the object identifier.

The additional server 310 compares 375 the local version vector to the client version vector in the request to determine whether the local version vector includes the client version vector. In various embodiments, the additional server 310 compares 375 various pairs included in the client version vector to pairs included in the local version vector. The additional server 310 compares 375 a client pair from the client version vector including a particular server identifier and a corresponding local server-specific version identifier to a local pair including the particular server identifier and a corresponding client server-specific version identifier. A comparison of the client pair from the client version vector to the local pair from the local version vector determines whether the local server-specific version identifier in the local pair is more recent than the client server-specific version identifier in the client pair. The additional server 310 performs the preceding comparison for each client pair included in the client version vector to determine whether the local version vector includes the client version vector.

For example, the additional server 310 determines whether the local version vector includes a local pair including a server identifier that is included in a client pair in the client version vector. In response to determining the local version vector includes a local pair having the server identifier included in the client pair from the client version vector, the comparison further determines whether the local pair in the local version vector having the server identifier included in the client pair includes a local server-specific version identifier generated by the server corresponding to the server identifier included in the client pair that is at least as recent as a client server-specific version identifier included in the client pair having the server identifier. As used herein, a local server-specific version identifier in the local version vector is at least as recent as a client server-specific version identifier in the client version vector. For example, a server-specific version identifier is a monotonically increasing sequence number, so a local server-specific version identifier that is greater than or equal to a client server-specific version identifier indicates the local version vector includes the client version vector. As another example, a server-specific version identifier is a timestamp, so a local server-specific version identifier in the local version vector not being earlier than a client server-specific version identifier in the client version vector indicates the local version vector includes the client version vector.

In response to the comparison determining the local version vector includes a local pair of server identifier of a server and corresponding local server-specific version identifier generated by the server for each server identifier included in a client pair of the client version vector and in response to determining that each local pair of server identifier and corresponding local server-specific version identifier in the local version vector is at least as recent as a client server-specific version identifier in a corresponding client pair including the server identifier from the client version vector, the additional server 310 determines the version of the data object stored 325 by the additional server 310 includes each modification to the data object represented by the client version vector and transmits 380 the version of the data object stored 325 by the additional server 310 to the reading client device 315. However, in response to the comparison determining the local version vector does not include at least one local pair including a server identifier that is included in a client pair of the client version vector, the additional server 310 transmits 380 an indication to the reading client device 315 that the additional server 310 does not include a current version of the data object (i.e., the copy of the data object stored 325 by the additional server 310 does not include one or more modifications identified by the client version vector). Similarly, in response to determining at least one local pair of a server identifier and corresponding local server-specific version identifier includes a local server-specific version identifier that is less recent than a client server-specific version identifier included in a client pair of the client version vector including the server identifier, the additional server 310 transmits 380 the to the reading client device 315 that the additional server 310 does not include a current version of the data object.

To provide illustrative examples of the comparison, the server 305 generates 345 a version vector of "(server 3, version 1), (server 1, version 2)" for the data object after storing 335 the updated version of the data object. In the example of FIG. 3, "server 3" is a server identifier of another server not shown in FIG. 3, while "server 1" is the server identifier of server 305. The example version vector in the preceding example indicates that the server 305 received one or more modifications to the data object from the alternative server with server identifier "server 3" for which the alternative server generated a server-specific version identifier of "version 1." Similarly, the example version vector indicates that the server 305 generated a server-specific version identifier of "version 2" for the version of the data object stored by server 305 after the modification received from the modifying client device 300. The version event transmitted 345 from the server 305 to the reading client device 315 includes an object identifier of the data object and the pair "(server 1, version 2)" to describe modifications made by the server 305 to the data object.

For purposes of illustration, in FIG. 3 the reading client device 315 maintains a client version vector of "(server 3, version 1), (server 1, version 1)", so the reading client device 315 (or the intermediate server) generates 365 a updated client version vector of "(server 3, version 1), (server 1, version 2)" based on the received version event. Hence, the reading client device 315 transmits 355 a request to the additional server 310 including "(server 3, version 1), (server 1, version 2)" along with the object identifier for the data object. The additional server 310 compares 360 the client version vector of "(server 3, version 1), (server 1, version 2)" in the request to a local version vector maintained by the additional server 310 for the copy of the data object stored 325 by the additional server 310.

In an example, the local version vector for the copy of the data object maintained by the additional server 310 is "(server 3, version 1), (server 1, version 2)," so the local version vector for the copy of the data object maintained by the additional server 310 matches the client version vector. Hence, the copy of the data object stored 325 by the additional server 310 includes each modification to the data object identified by the client version vector, so the additional server 310 transmits 380 the locally stored copy of the data object to the reading client device 315. As another example, the local version vector for the copy of the data object maintained by the additional server is "(server 3, version 1), (server 1, version 3)." In this example, the copy of the data object stored 325 by the additional server 310 includes the modifications to the data object identified by the client version vector, as well as additional modifications to the data object after the modifications identified by the client version vector. The server-specific version identifier of "version 3" in the local pair of "(server 1, version 3)" in the local version vector indicates the copy of the data object stored 325 by the additional server 310 is a more recently modified version of the data object than the "version 2" server-specific version identifier included in the client pair of "(server 1, version 2)" for the server identifier "server 1" in the client version vector. Hence, the copy of the data object stored 325 by the additional server 310 includes each modification to the data object included in the client version vector, as well as additional subsequent modifications to the data object, so the copy of the data object stored 325 by the additional server is current and the additional server 310 transmits 380 the copy of the data object to the reading client device 315.

In an alternative example, the additional server 310 maintains a local version vector for the copy of the data object of "(server 3, version 1)," while the received request from the reading client device 315 includes the client version vector of "(server 3, version 1), (server 1, version 2)." In the preceding example, the local version vector for the copy of the data object stored 325 by the additional server 310 does not include a local pair of a server identifier and a server-specific version identifier including the server identifier of "server 1," which is included in the client pair of "(server 1, version 2)" in the client version vector. Hence, the copy of the data object maintained by the additional server 310 does not include modifications to the data object previously saved by the server 305, which corresponds to the server identifier of "server 1," so the additional server 310 transmits 365 an indication to the reading client device 315 that the additional server 310 does not include a current copy of the data object.

For an alternative example, the additional server 310 maintains a local version vector for the copy of the data object stored 325 by the additional server 310 of "(server 3, version 1), (server 1, version 1)," while the client version vector in the request is "(server 3, version 1), (server 1, version 2)." In the preceding example, the local version vector for the copy of the data object stored 325 by the additional server 310 includes a local pair of "(server 1, version 1)", which identifies a version of the data object from the server 305, which corresponds to the "server 1" server identifier, that does not include the modifications to the data object identified by the client pair of "(server 1, version 2)" included in the client version vector. Hence, the copy of the data object maintained by the additional server 310 does not include modifications to the data object previously saved by the server 305 that were identified to the reading client device 315 by the version event. As the copy of the data object stored 325 by the additional server 310 does not include at least one modification to the data object identified by the version event, the additional server 310 transmits 365 the indication to the reading client device 315 that the additional server 310 does not include a current copy of the data object.

In a further example, the reading client device 315 has not previously received a version events, so the reading client device 315 (or the intermediate server) generates 365 a client version vector of "(server 1, version 2)" based on the received version event from the server 305. Hence, the reading client device 315 transmits 370 a request to the additional server 310 including "(server 1, version 2)" along with the object identifier for the data object. The additional server 310 maintains a local version vector for the copy of data object of "(server 3, version 1), (server 1, version 2)" in this example. The additional server 310 compares 375 the client version vector of "(server 1, version 2)" in the request to the local version vector. The comparison determines that the local version vector of "(server 3, version 1), (server 1, version 2)" includes each client pair in the client version vector. While the local version vector maintained by the additional server 310 includes a local pair of "(server 3, version 1)," representing additional modifications from another server that the reading client device 315 has yet to receive, the local version vector includes a local pair including each server identifier included in a client pair of the client version vector. Hence, the copy of the data object stored 325 by the additional server 310 includes each modification to the data object included in the client version vector, as well as additional modifications to the data object from another server, so the copy of the data object stored 325 by the additional server is current and the additional server 310 transmits 380 the copy of the data object to the reading client device 315.

In various embodiments, in response to receiving the indication that the additional server 310 does not include a current version of the data object, the reading client device 315 transmits an additional request for the data object including the client version vector after waiting an amount of time. The amount of time the reading client device 315 waits before sending the additional request is a predetermined amount of time specified by an application executing on the reading client device 315 for accessing the distributed system in some embodiments. As another example, the indication includes an amount of time for the reading client device 315 to wait before sending the additional request. Each additional request includes the client version vector from the reading client device 315 for the additional server 310 to compare 375 to its local version vector for the copy of the data object stored 325 by the additional server 310. In response to the comparison in response to receiving the additional request determining the local version vector includes the client version vector, as further described above, the additional server 310 transmits 365 the copy of the data object to the reading client device 315. Alternatively, after obtaining modifications to the data object causing an updated local version vector generated by the additional server 310 to include the client version vector received in the request from the reading client device 315, the additional server 310 transmits the modified data object to the reading client device 315.

FIG. 4 illustrates a flowchart of a method for a server of a distributed system determining whether locally stored data is current in response to a request from a client device using a local version vector of the locally stored data, in accordance with one or more embodiments. Steps of the method described in conjunction with FIG. 4 may be performed by a server included in a distributed system, such as by a server included in the task management system 130. Alternative embodiments may include more, fewer, or different steps from those illustrated in FIG. 4, and the steps may be performed in a different order from the order illustrated in FIG. 4.

As further described above in conjunction with FIG. 3, a distributed system (e.g., the task management system 130) includes multiple servers that store data objects and that exchange data between each other through a network 120. A client device 100 accessing the distributed system may retrieve data from different servers at different times. For example, the distributed system includes different servers corresponding to different geographic regions, and a client device 100 obtains data from a server corresponding to a geographic region including, or associated with, the client device 100. So, different client devices 100 may obtain data from different servers, or a client device 100 may obtain data from different servers at different times.

To facilitate data retrieval independent of a server accessed by a client device, each server maintains a local copy of a data object. Examples of data objects include documents, tasks, files, or other data capable of being stored by a server. When a data object is modified, a particular server receives the modification and stores an updated version of the data object. The particular server subsequently distributes the one or more modifications to the data object to different servers over time, with the different servers generating modified versions of their locally stored copies of the data object to include the one or more modifications. This allows users to retrieve the updated version of the data object from each server of the distributed system. As further described above in conjunction with FIG. 3, propagation of the modified version of the data object from the particular server to other servers takes different amounts of time, so different servers may temporarily maintain different versions of the data object at different times. Hence, when a client device 100 retrieves the data object from a server, the copy of the data object stored by the server may not include modifications to the data object previously stored by a different server.

A server of the distributed system stores 405 a copy of a data object, with other servers of the distributed system also storing copies of the data object. To track modification of the data object, the server generates 410 a local version vector for the data object that identifies prior modifications to the data object by one or more servers of the distributed system. The local version vector is stored by the server to provide a record of modifications to the copy of the data object obtained by the server. A modification to the copy of the data object may be performed by the server performing one or more modifications to the copy of the data object provided to the server and storing an updated version of the copy of the data object after performing the modifications. Alternatively, the server receives an updated version of the data object and stores the received updated version of the data object.

Multiple different servers may modify their locally stored copy of the data object and propagate the locally made modifications to other servers so each server of the distributed system maintains a common version of the data object (i.e., so each server of the distributed system maintains a local copy of the data object that includes one or more modifications to the data object by other servers). A server modifying a locally stored copy of the data object generates a server-specific version identifier for the copy of the data object locally maintained by the server. The server stores the server-specific version identifier in association with an object identifier of the data object. In some embodiments, the server-specific version identifier is a timestamp from a timing system (e.g., a clock) local to the server corresponding to a time when the server locally stored an updated version of a local copy of the data object, as further described above in conjunction with FIG. 3. Alternatively, the server-specific version identifier is a monotonically increasing sequence number that the server increments by one (or by another fixed value) when the server locally stores an updated version of a local copy of the data object.

Additionally, the server propagates one or more modifications to the data object to additional servers of the distributed system. When propagating the one or more modifications to the data object from a server to an additional server, the server also distributes a pair including a server identifier of the server and the server-specific version identifier generated by the server along with an object identifier of the data object. The additional server modifies its locally stored copy of the data object based on the one or more modifications to the data object received from the server.

When the server of the distributed system stores the copy of the data object and a corresponding pair including a server identifier of the server and the server-specific version identifier from the server modifying the data object, the server generates 410 a local version vector including one or more local pairs of a server identifier and a local server-specific version identifier generated by a server corresponding to the server identifier. A local pair in the local version vector includes a server identifier of a server from which the server obtained one or more modifications to the data object and a local server-specific version identifier generated by the server from which the one or more modifications were obtained (e.g., a timestamp generated by the server from which the one or more modifications were obtained, a sequence number generated by the server from which the one or more modifications were obtained). A server from which the one or more modifications were obtained may be the server itself or an additional server. The local version vector includes a local pair corresponding to each server from which one or more modifications to the data object were obtained. In various embodiments, when generating 410 the local version vector, the server maintains a single local server-specific version identifier for each server from which the server obtained one or more modifications to the data object. For example, each local pair of the local version vector includes a server identifier of a server from which the server obtained one or more modifications to the data object and a server-specific version identifier with the most recent value computed from version pairs received from the server from which the server obtained one or more modifications to the data object.

The server stores 415 the local version vector in association with the object identifier for the data object. Associating the local version vector with the object identifier allows the server to use the local pairs of server identifiers and corresponding local server-specific version identifiers from servers from which the server obtained one or more modifications to the data object as a record for the server of modifications to the data object previously obtained by the server. As modifications to the data object made by other servers take varying amounts of time to reach the server for modifying the copy of the data object stored by the server, having a local pair in the local version vector for each server from which the server obtained one or more modifications to the data object and corresponding local server-specific version identifier from the server from which the server obtained one or more modifications to the data object enables the server to identify whether particular modifications to the data object have been incorporated into the copy of the data object maintained by the server.

The server receives 420 a request from a client device 100 to retrieve the copy of the data object. As further described above in conjunction with FIG. 3, the request includes the object identifier of the data object and a client version vector. The client version vector includes one or more client pairs that each include a server identifier and a client server-specific version identifier the client device 100 received from the server corresponding to the server identifier. A server identifier in a client pair of the client version vector corresponds to a server from which the client device 100 received an event notification including the object identifier. As further described above in conjunction with FIG. 3, when a server making a local modification stores an updated version of the data object, the server transmits an event notification to one or more client devices 100. For example, the server transmits a version event to client devices 100 associated with users for whom the distributed system maintains attributes allowing the users to access the data object. The event notification includes the server identifier of the server storing the updated version of the data object and server-specific version of the data object generated by the server storing the updated version of the data object. The client version vector includes a client pair for each server identifier from which the client device 100 received a version event and corresponding client server-specific version included in the version event. Hence, the client version vector establishes a record of current versions of the data object identified to the client device 100 by one or more servers of the distributed system.

In response to receiving 420 the request including the object identifier and the client version vector, the server determines 425 whether the local version vector the server associates with the object identifier includes of the client version vector. The server determines 425 whether the local version vector includes the client version vector by comparing client pairs in the client version vector to local pairs in the local version vector. For example, the server determines whether each local pair in the local version vector including a server identifier that is in a client pair of the client version vector includes a local server-specific version identifier that is at least as recent as the client server-specific version identifier in the client version vector, as further described above in conjunction with FIG. 3. The server performs the preceding comparison for each client pair included in the client version vector to one or more local pairs in the local version vector to determine 425 whether the local version vector includes the client version vector.

For example, the server determines whether each server identifier included in a client pair of the client version vector is included in the local version vector. In response to determining the local version vector each server identifier included in a client pair from the client version vector, the server determines whether a local pair in the local version vector having the server identifier included in the client pair includes a local server-specific version identifier that is at least as recent as a client server-specific version identifier included in the client pair having the server identifier. A local server-specific version identifier in the local version vector is at least as recent as a client server-specific version identifier in the client version vector in response to the local server-specific version identifier equaling or exceeding the client server-specific version identifier. For example, a server-specific version identifier is a monotonically increasing sequence number, so a local server-specific version identifier being a sequence number equaling or exceeding a client server-specific version identifier indicates the local version vector includes the client version vector. Similarly, a server-specific version identifier is a timestamp, so a local server-specific version identifier that is a time that is not earlier than a time comprising the client server-specific version identifier in the client version vector indicates the local version vector includes the client version vector.

In response to the local version vector including each server identifier included in the client version and in response to each local pair in the local version vector having a server identifier includes a local server-specific version identifier that is at least as recent as a client server-specific version identifier included in a client pair in the client version having the server identifier, the server determines 425 the local version vector includes the client version vector. In response to determining 425 the local version vector includes the client version vector, the server determines that the locally stored copy of the data object includes at least the modifications to the data object identified to the client device 100 by the version events. Hence, the server transmits 430 the stored copy of the data object to the client device 100. Having the local version vector include the client version vector indicates that the copy of the data object stored 405 by the server has previously been modified to include at least the modifications identified to the client device 100 via version events, so the copy of the data object stored 405 by the server is current relative to the version events received by the client device 100.

However, in response to the server determining 425 the local version vector does not include the client version vector, the server transmits 435 an indication to the client device 100 that the copy of the data object stored 405 by the server does not include one or more of the modification previously identified to the client device 100 by version events. As further described above in conjunction with FIG. 3, the server determines 425 the local version vector does not include the client version vector in response to at least one local pair in the local version vector that has a server identifier included in the client version vector and having a local server-specific version identifier that is older than a client server-specific version identifier a client pair of client version vector including the server identifier. Similarly, the server determines 425 the local version vector does not include client version vector in response to the client version vector including at least one server identifier that is not included in the local version vector.

Having a server of a distributed system generate a local version vector including local pairs identifying one or more servers from which the server obtained modifications to a data object and server-specific version identifiers generated by each of the one or more servers from which the server obtained modifications to the data object allows the server to maintain a record of modifications to the data object received by the server. This allows multiple servers of the distributed system to modify locally stored copies of the data object, and for servers to propagate locally made modifications to a copy of the data object to other servers, providing a consistent version of the data object accessible independent of which server of the distributed system is used to access the data object. Additionally, generation of the local version vector by a server that modifies the data object allows multiple servers to modify the data object without communicating the modifications to each other when the data object is modified, increasing a rate at which the data object may be modified by the distributed system. Further, because the local version vector includes multiple local pairs of server identifiers, mitigates potential inconsistency in modifying the data object by different servers by removing potential inconsistencies between relative timing of modifications to the data object by different servers because of variations in locally maintained clocks, or other timing information, between different servers.

Additional Considerations

The foregoing description of the embodiments has been presented for the purpose of illustration; a person of ordinary skill in the art would recognize that many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable storage medium comprises one or more computer-readable media that, individually or together, comprise instructions that, when executed by one or more processors, cause the one or more processors to perform, individually or together, the steps of the instructions stored or encoded on the one or more computer-readable storage media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable storage media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:

storing, at a server of a distributed system, a data object;

storing an updated version of the data object at the server in response to receiving one or more modifications to the data object;

storing a server-specific version identifier generated by the server in association with an object identifier of the data object at the server;

generating, by the server, a version vector for the data object, the version vector including a pair including a server identifier of the server and the server-specific version identifier of the data object generated by the server;

transmitting a version event from the server to one or more client devices, the version event including an object identifier for the data object and the version vector for the data object;

receiving, at an additional server of the distributed system that is different from the server and that includes a copy of the data object, a request from a client device including the data object identifier and a client version vector for the data object, the client version vector including one or more client pairs, each client pair including a server identifier of a server from which the client device received one or more version events including the object identifier and a client server-specific version identifier generated by the server from which the client device received one or more version events including the object identifier; and transmitting the copy of the data object from the additional server to the client device in response to the additional server determining a local version vector associated with the object identifier by the additional server includes the client version vector, the local version vector including a local pair for each server from which the additional server obtained one or more modifications to the data object, the local pair including a server identifier of a server from which the additional server obtained one or more modifications to the data object and a local server-specific version identifier generated by the server from which the additional server obtained one or more modifications to the data object.

2. The method of claim 1, wherein the additional server determining the local version vector associated with the object identifier by the additional server includes the client version vector comprises:

the additional server determining the local version vector includes each server identifier of a server from which the client device received one or more version events in the client version vector; and for each client pair included in the client version vector, the additional server identifying a local pair included in the local version vector having the server identifier of the server from which the client device received one or more version events including the object identifier and determining the identified local pair includes a local server-specific version identifier that is at least as recent as the client server-specific version identifier included in the client pair including the server identifier of the server from which the client device received one or more version events including the object identifier.

3. The method of claim 2, wherein the client server-specific version identifier comprises a client monotonically increasing sequence number and the local server-specific version identifier comprises a local monotonically increasing sequence number.

4. The method of claim 3, wherein determining the identified local pair includes the local server-specific version identifier that is at least as recent as the client server-specific version identifier included in the client pair including the server identifier of the server from which the client device received one or more version events including the object identifier comprises:

determining the local monotonically increasing sequence number in the identified local pair in the local version vector is not less than the client monotonically increasing sequence number in the client pair in the client version vector.

5. The method of claim 2, wherein a server-specific version identifier generated by the server from which the client device received one or more version events comprises a timestamp generated by the server from which the client device received one or more version events and a server-specific version identifier generated by the server from which the additional server received modifications to the copy of the data object comprises an additional timestamp generated by the server from which the additional server received modifications to the copy of the data object.

6. The method of claim 5, wherein determining the identified local pair includes the local server-specific version identifier that is at least as recent as the client server-specific version identifier included in the client pair including the server identifier of the server from which the client device received one or more version events including the object identifier comprises:

determining the additional timestamp in the identified local pair in the local version vector is not less than the timestamp in the client pair in the client version vector.

7. The method of claim 1, further comprising:

transmitting an indication from the additional server to the client device that the copy of the data object stored on the additional server is not current response to the additional server determining the local version vector associated with the object identifier by the additional server does not include the client version vector.

8. The method of claim 7, wherein determining the local version vector associated with the object identifier by the additional server does not include the client version vector comprises:

the additional server determining at least one local pair in the local version vector having a server identifier matching a server identifier included in a client pair in the client version vector includes a local server-specific version identifier that is older than the client server-specific version identifier included in a pair in the client version vector including the server identifier.

9. A method comprising:

storing a data object at a server of a distributed system, the data object associated with an object identifier;

generating, by the server, a local version vector for the data object, the local version vector including a local pair for each server from which the server obtained one or more modifications to the data object, the local pair including a server identifier of a server from which the server obtained one or more modifications to the data object and a local server-specific version identifier generated by the server from which the server obtained one or more modifications to the data object;

storing the local version vector at the server in association with the object identifier;

receiving, a request from a client device including the object identifier and a client version vector for the data object, the client version vector including one or more client pairs, each client pair including a server identifier of a server from which the client device received a version event including the object identifier and a client server-specific version identifier generated by the server from which the client device received the version event including the object identifier; and in response to the server determining the local version vector associated with the object identifier by the server includes the client version vector, transmitting the data object from the server to the client device.

10. The method of claim 9, wherein determining the local version vector associated with the object identifier by the server includes the client version vector comprises:

determining the local version vector includes each server identifier included in the client version vector; and for each client pair included in the client version vector, the server identifying a local pair included in the local version vector having the server identifier of the server from which the client device received one or more version events including the object identifier and determining the identified local pair includes a local server-specific version identifier that is at least as recent as the client server-specific version identifier included in the client pair including the server identifier of the server from which the client device received one or more version events including the object identifier.

11. The method of claim 10, wherein the client server-specific version identifier comprises a client monotonically increasing sequence number and the local server-specific version identifier comprises a local monotonically increasing sequence number.

12. The method of claim 11, wherein determining the identified local pair includes the local server-specific version identifier that is at least as recent as the client server-specific version identifier included in the client pair including the server identifier of the server from which the client device received one or more version events including the object identifier comprises:

determining the local monotonically increasing sequence number in the identified local pair in the local version vector is not less than the client monotonically increasing sequence number in the client pair in the client version vector.

13. The method of claim 10, wherein a server-specific version identifier generated by the server from which the client device received one or more version events comprises a timestamp generated by the server from which the client device received one or more version events and a server-specific version identifier generated by the server from which the server obtained one or more modifications to the data object comprises an additional timestamp generated by the server from which the server obtained one or more modifications to the data object.

14. The method of claim 13, wherein determining the identified local pair includes the local server-specific version identifier that is at least as recent as the client server-specific version identifier included in the client pair including the server identifier of the server from which the client device received one or more version events including the object identifier comprises:

determining the additional timestamp in the identified local pair in the local version vector is not less than the timestamp in the client pair in the client version vector.

15. The method of claim 9, further comprising:

in response to the server determining the local version vector associated with the object identifier by the server does not include the client version vector, transmitting an indication from the server to the client device that the data object stored by server is not current.

16. The method of claim 15, wherein determining the local version vector associated with the object identifier by the server does not include the client version vector comprises:

determining at least one local pair in the local version vector having a server identifier matching a server identifier included in a client pair in the client version vector includes a local server-specific version identifier that is older than the client server-specific version identifier included in a pair in the client version vector including the server identifier included in the client pair.

17. A computer program product comprising a non-transitory computer readable storage medium having instructions encoded thereon that, when executed by a processor, cause the processor to perform steps comprising:

storing a data object at a server of a distributed system, the data object associated with an object identifier;

generating, by the server, a local version vector for the data object, the local version vector including a local pair for each server from which the server obtained one or more modifications to the data object, the local pair including a server identifier of a server from which the server obtained one or more modifications to the data object and a local server-specific version identifier generated by the server from which the server obtained one or more modifications to the data object;

storing the local version vector at the server in association with the object identifier;

receiving, a request from a client device including the object identifier and a client version vector for the data object, the client version vector including one or more client pairs, each client pair including a server identifier of a server from which the client device received a version event including the object identifier and a client server-specific version identifier generated by the server from which the client device received the version event including the object identifier; and in response to the server determining the local version vector associated with the object identifier by the server includes the client version vector, transmitting the data object from the server to the client device.

18. The computer program product of claim 17, wherein determining the local version vector associated with the object identifier by the server includes the client version vector comprises:

determining the local version vector includes each server identifier included in the client version vector; and for each client pair included in the client version vector, the server identifying a local pair included in the local version vector having the server identifier of the server from which the client device received one or more version events including the object identifier and determining the identified local pair includes a local server-specific version identifier that is at least as recent as the client server-specific version identifier included in the client pair including the server identifier of the server from which the client device received one or more version events including the object identifier.

19. The computer program product of claim 17, wherein the non-transitory computer readable storage medium further has instructions encoded thereon that, when executed by the processor, cause the processor to perform steps comprising:

in response to the server determining the local version vector associated with the object identifier by the server does not include the client version vector, transmitting an indication from the server to the client device that the data object stored by server is not current.

20. The computer program product of claim 19, wherein determining the local version vector associated with the object identifier by the server does not include the client version vector comprises:

determining at least one local pair in the local version vector having a server identifier matching a server identifier included in a client pair in the client version vector includes a local server-specific version identifier that is older than the client server-specific version identifier included in a pair in the client version vector including the server identifier included in the client pair.

\* \* \* \* \*